United States Patent
Huber et al.

(10) Patent No.: US 6,769,195 B2
(45) Date of Patent: Aug. 3, 2004

(54) LINEAR ENCODER AND LINEAR GUIDE ASSEMBLY WITH THE LINEAR ENCODER

(75) Inventors: Helmut Huber, Palling (DE); Siegbert Holstein, Stein/Traun (DE); Horst Gschossmann, Tuessing/Heiligenstatt (DE); Oliver Schenk, Kirchweidach (DE); Sebastian Tondorf, Waging am See (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/397,680

(22) Filed: Mar. 26, 2003

(65) Prior Publication Data

US 2003/0182816 A1 Oct. 2, 2003

(30) Foreign Application Priority Data

Mar. 30, 2002 (DE) .......................... 102 14 426
Mar. 30, 2002 (DE) .......................... 102 14 427

(51) Int. Cl.⁷ .............................................. G01B 7/02
(52) U.S. Cl. ........................................... 33/706; 33/708
(58) Field of Search ........................ 33/706–710, 1 M

(56) References Cited

U.S. PATENT DOCUMENTS

| | | | | |
|---|---|---|---|---|
| 5,842,283 A | * | 12/1998 | Yatsu et al. | 33/706 |
| 6,119,357 A | * | 9/2000 | Ochiai et al. | 33/708 |
| 6,510,614 B1 | * | 1/2003 | Kato et al. | 33/706 |
| 6,532,681 B2 | * | 3/2003 | Tondorf | 33/706 |
| 6,564,468 B2 | * | 5/2003 | Blattner et al. | 33/706 |
| 2003/0159305 A1 | * | 8/2003 | Wahl et al. | 33/707 |

* cited by examiner

Primary Examiner—Diego Gutierrez
Assistant Examiner—Yaritza Guadalupe
(74) Attorney, Agent, or Firm—Sidley Austin Brown & Wood, LLP

(57) ABSTRACT

A linear encoder for use with a guide assembly includes a scale (21), a head (22) for scanning the scale (21), and mounting elements (30) for releasably attaching the scale (21) to the guide rail (11) of the guide assembly, with the mounting elements (30) being arrangeable outside of the mounting surface (14) of the guide rail (11) and having stop surfaces (31, 32) extending perpendicular to the longitudinal direction (X) of the guide rail (11) for a parallel alignment of the scale (21) along the guide rail (11) and encompassing and engaging reference surface (15, 16) of the guide rail (11).

21 Claims, 5 Drawing Sheets

LINEAR ENCODER AND LINEAR GUIDE ASSEMBLY WITH THE LINEAR ENCODER

BACKGROUND OF THE INVENTION

1. Field of the Invention

The present invention relates to a linear encoder and a linear guide assembly including the linear encoder.

2. Description of the Prior Art

Pre-assembled guide units, which consist of a hardened and ground guide rail and a displaceable thereon, on roller or ball elements, carriage, are used more and more in machine-tools and measuring machines. The guide unit is formed as an independent modular unit, with the guide rail being mountable with its mounting surface on a machine base and with the carriage being mounted on a machine slide.

For measuring the relative position of the carriage relative to the guide rail, international publication WO91/16594 discloses, e.g., gluing a scale directly on a surface of the guide rail. Because during the operation, the carriage is displaced above the scale, in case of damage, it is very difficult to replace the scale.

U.S. Pat. No. 5,687,489 discloses mounting on the guide rail, before the guide assembly is mounted in the machine, of a relatively easily replaceable, linear encoder. The linear encoder consists of a scale and a scanning head arranged in a housing. For mounting the encoder housing on the guide rail, the housing is provided with means that formlockingly engage in a recess provided on the guide rail. For mounting the linear encoder on the guide rail, relatively complicated retaining and receiving elements are provided in the guide rail for which in addition to guide surfaces, a space along the entire length of the guide rail must be available.

Accordingly, an object of the invention is an easily replaceable linear encoder that can be mounted on a guide rail of a guide assembly in a space-saving manner.

Another object of the invention is to provide a linear encoder of the type described above that would permit an easy alignment of the linear encoder scale parallel to and along the guide rail.

SUMMARY OF THE INVENTION

These and other objects of the present invention, which will become apparent hereinafter, are achieved by providing a linear encoder for use with a linear guide assembly formed as a separate unit and having a guide rail extending in a longitudinal direction having a mounting surface of a machine, with the linear encoder including a scale, a scanning head for scanning the scale, and mounting means for releasably attaching the scale to the guide rail of the guide assembly, with the mounting means being arrangeable outside of the mounting surface of the guide rail and having stop surfaces extending perpendicular to the longitudinal direction of the guide rail for a parallel alignment of the scale along the guide rail, and with the stop surfaces encompassing and engaging reference surfaces of the guide rail.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
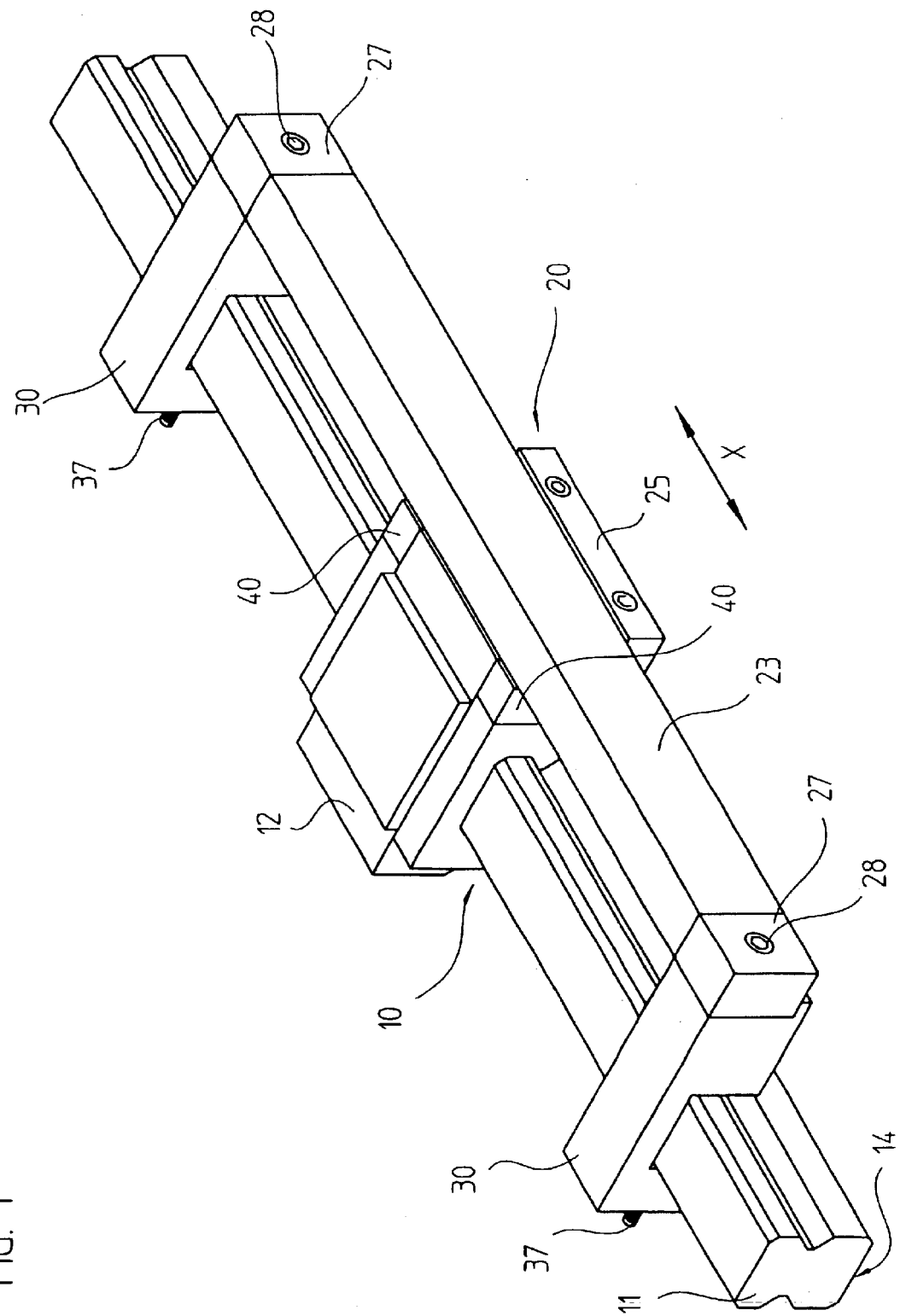
FIG. 1. a perspective view of a linear guide assembly with a linear encoder.
Figure 2:
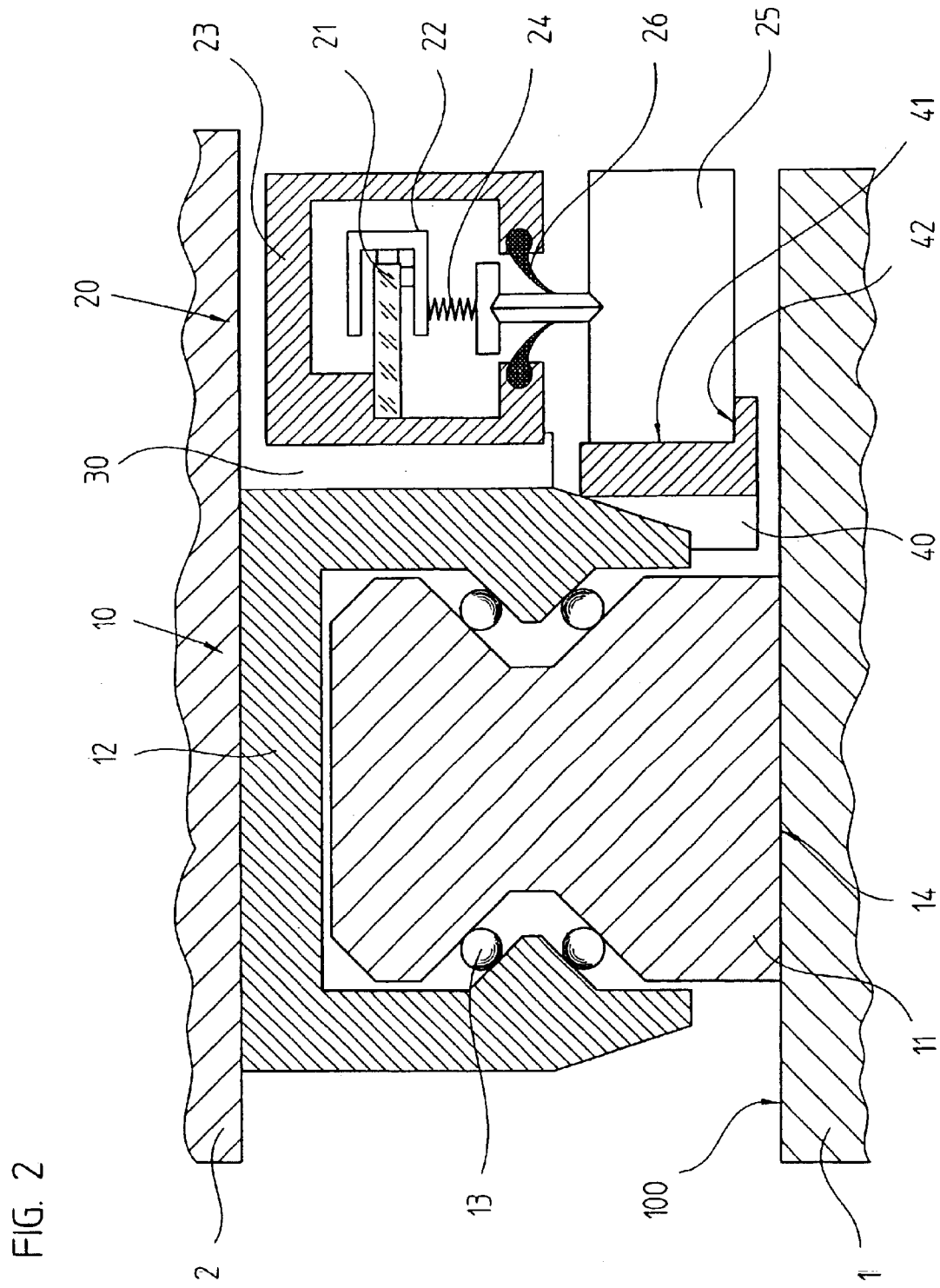
FIG. 2. a cross-sectional view of the linear guide assembly of FIG. 1 in the region of the guide assembly carriage.
Figure 3:
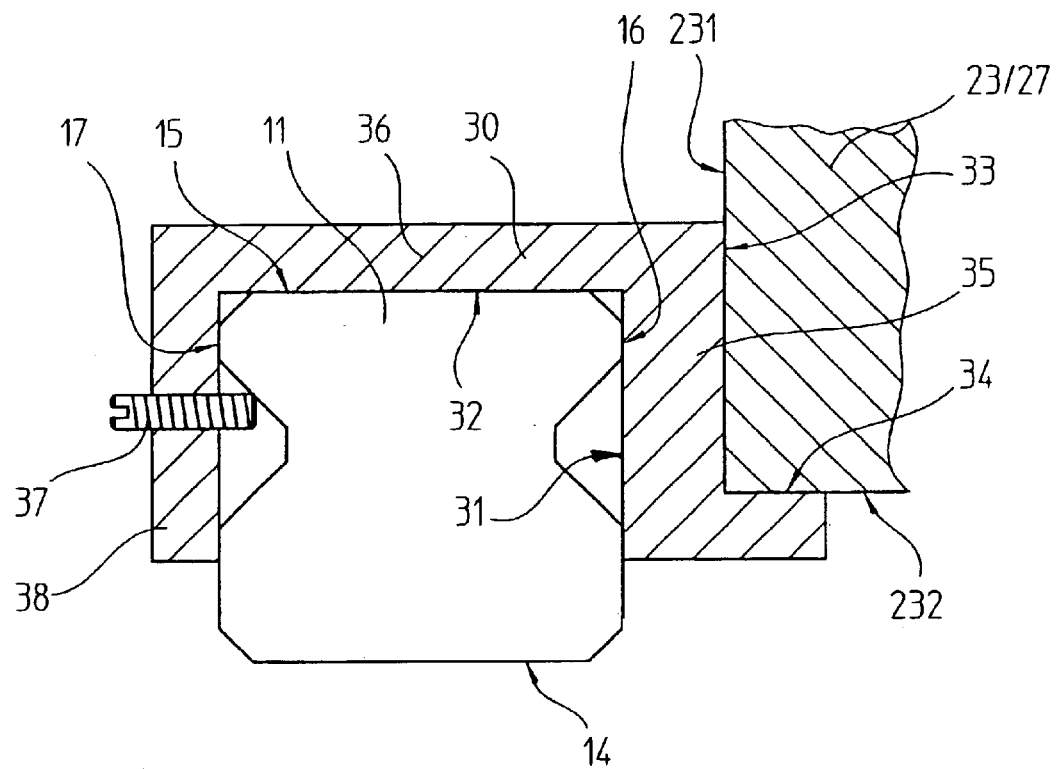
FIG. 3. a cross-sectional view of a linear guide assembly of FIG. 1 in the region of a mounting element.

A first embodiment of a linear guide assembly, on the basis of which the features of the present invention will be explained, is shown in FIGS. 1–3. A linear guide assembly 10 includes a guide rail 11 having guide surfaces extending in a longitudinal direction X, and a carriage 12 displaceable along the guide rail 11 on roller or ball elements 13. The guide rail 11 and the carriage 12 form a pre-assembled separate unit. The guide rail 11 is mounted on a machine base 1 with its mounting surface 14 and is connected to the machine base 1, e.g., with screws (not shown). The carriage 12 is connected with the machine slide 2.

For measuring the relative position of the machine slide 2 with respect to the machine base 1, a linear encoder 20 is used. The linear encoder 20 consists essentially of a scale 21 which is secured on the guide rail 11, and a scanning head 22 which is secured on the carriage 12. At optico-electrical, capacitive, magnetic or inductive scanning of the graduation of the scale 21, the scanning head 22 generates position-dependent electrical scanning signals for a controlled positioning of the machine slide 2 relative to the machine base 1.

For a exact position measuring, it is necessary that the scale 21 extends parallel to the longitudinal direction X of the guide rail 11. To provide for a parallel alignment of the scale 21 with the guide rail 11, a plurality of spaced from each other in the longitudinal direction X, mounting elements 30 is used. Each mounting element 30 is supported on the guide rail 11 with its stop surfaces 31, 32 which extend perpendicular to the longitudinal direction X and cooperate with corresponding reference surfaces 15, 16 of the guide rail 11. During the manufacturing of the guide rail 11, the reference surfaces 15, 16 are treated with high precision for guiding the carriage 12 and are homogeneously integrated in outer surfaces, extending in the longitudinal direction X. The reference surface 15 extends parallel to the rail mounting surface 14 and forms the upper surface of the guide rail 11, whereas the reference surface 16 forms a side surface of the guide rail 11 which extends transverse to the upper, reference surface 15.

The mounting element 30 is formed as a U-shaped element, with the side leg 35 forming the stop surface 31 and with connection leg 36 forming the stop surface 32. A further side leg 38 support a locking element 37 which serves for a releasable locking of the mounting element 30 on the guide rail 11. The mounting element 30 encompasses the guide rail 11, and the locking element 37 is supported, on one hand, on the mounting element 30 and, on the other hand, against a side surface 17 of the guide rail 11 which is opposite the reference surface 16. Thereby, the stop surface 31, 32 are pulled tightly against the reference surfaces 15, 16.

The scale 21 is carried by the mounting elements 30. There are many possibilities of attaching the scale 21 to the mounting elements 30. One of the possibilities consists in that a manufacturer of the scale 21 would aligned it with respect to the stop surface 31, 32 and secure it to the mounting elements 30. A second possibility of mounting of the scale 21 on the mounting element 30 is shown in FIGS. 1–3. In the embodiment of FIGS. 1–3, the linear encoder 20 is formed as a sealed linear encoder, in which the scale 21 and the scanning head 22 are arranged in the housing 23. The scanning head 22 is displaced on the scale 21 and/or the housing 23, being supported on the surface of scale 21 and/or the housing 23 and sliding or rolling, on roller or ball bearings, therealong. The scanning head 22 is secured by a coupling 24 to a carrier 25. The coupling 24 is rigid in the longitudinal direction X, i.e., in the measuring direction, but is yielding in directions transverse to the longitudinal direction X. The displacements of the carrier 25 are transmitted to the scanning head 22, whereby the scanning head 22 is displaced in the longitudinal direction X.

The housing 23 is sealed with roof-formed elastic sealing lips 26. The carrier 25 is sword-shaped in the passage through the sealing lips 26. Outside this passage the carrier forms a stable part mountable on the carriage 12.

At this second, particular advantageous possibility of mounting the scale 21 on the mounting elements 30, the mounting elements 30 have outer stop surfaces 33, 34 extending transverse to each other and extending both in the longitudinal direction 30. The stop surfaces 33, 34 cooperate with side surfaces 231, 232 of the housing 23. The stop surfaces 33, 34 provide for alignment of the housing 23 with respect to the stop surfaces 31, 32 and, thereby, for a alignment of the housing 23 parallel to the guide rail 11.

When the linear encoder 20 is formed as a seal encoder, the housing 23 is formed as an aluminum profile securable with its end pieces 27 to the to-be-measured part by screws 28. As shown in FIG. 1, the end pieces are screwed on the mounting elements 30 with screws 28. The stop surfaces 231, 232 of the housing 23 are provided on the end pieces 27.

Figure 5:
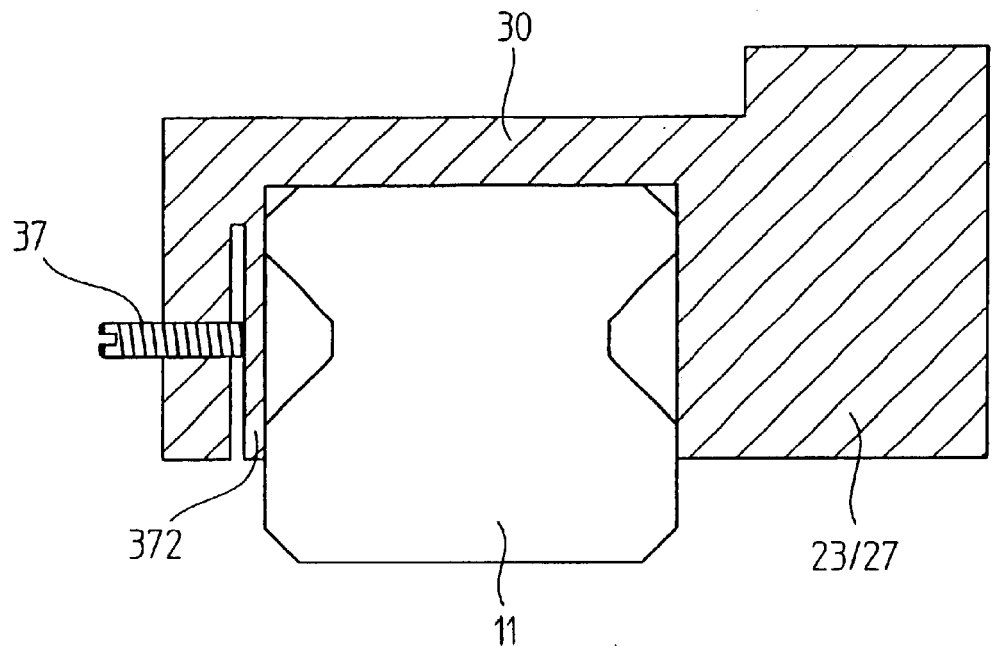
FIG. 5. a cross-sectional view of a linear guide assembly according to a third embodiment of the present invention in the region of the mounting element.

A third possibility of attaching the scale 21 to the mounting element 30 is shown in FIG. 5. The scale 21 is integrated in the housing 23 in a manner shown in FIG. 2. The mounting element 30 is formed on the housing 23 itself or the end piece 27. The mounting element 30 can form a one-piece part with the end piece 27 for closing the end of the housing 23.

A releasable mounting of the mounting element 30 on the guide rail 11 is effected with screws 37 in the same way as in the embodiment of FIGS. 1–3. The screws 27 are supported against a side surface 17 of the guide rail 11.

As it is shown schematically in FIG. 3, advantageously, the screws 37 are so supported on the side surface 17 that a pressure force acts in two, perpendicular to each of the directions which are perpendicular to the longitudinal direction X. As a result, the mounting element 30 is drawn tightly with its inner stop surfaces 31, 32 to the corresponding reference surfaces 15, 16 of the guide rail 11.

Figure 4:
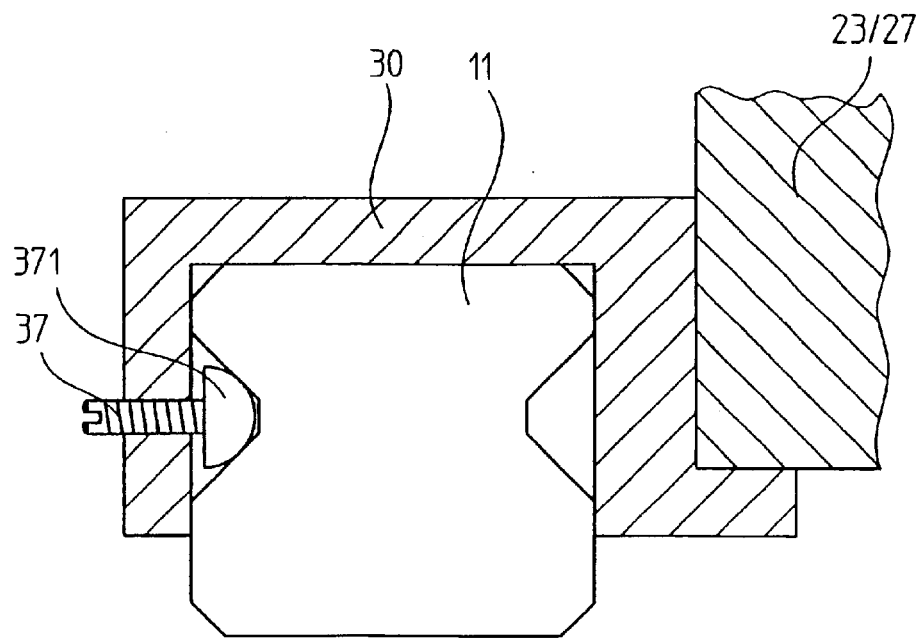
FIG. 4. a cross-sectional view of a linear guide assembly according to a second embodiment of the present invention in the region of the mounting element.

In the embodiment shown in FIG. 4, the screw 37 is not supported directly on the side surface 17 of the guide rail 11 but on an intermediate piece 371. Advantageously, the intermediate piece 371 is adapted to the guide surfaces of the guide rail 11.

According to FIG. 5, the intermediate piece is formed on the mounting element 30 as a web 372.

Figure 6:
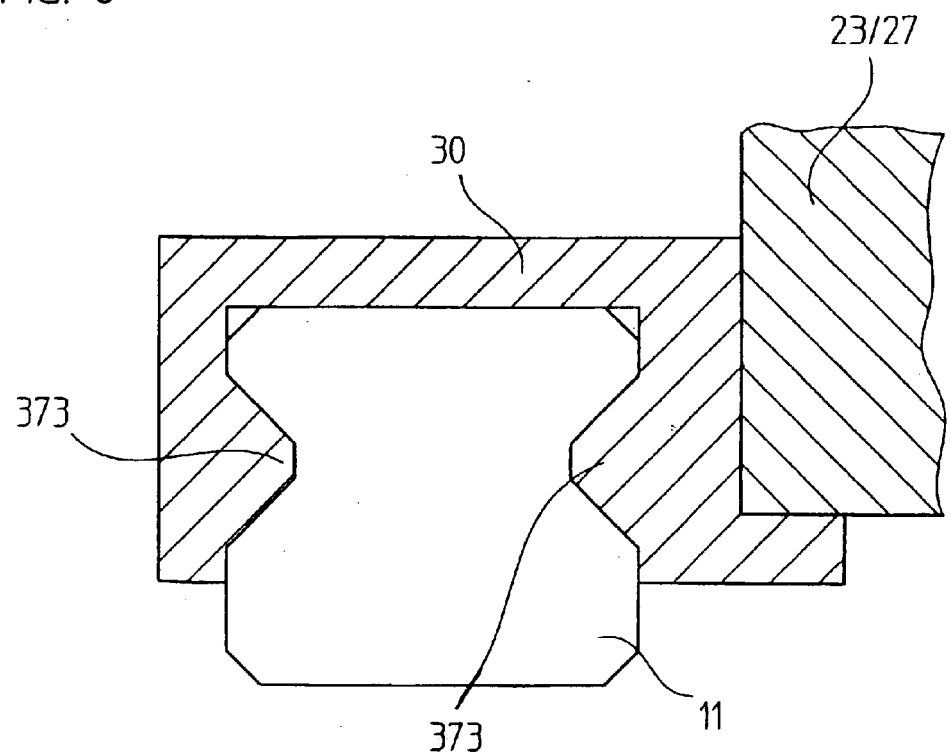
FIG. 6. a cross-sectional view of a linear guide assembly according to a fourth embodiment of the present invention in the region of the mounting element.

In the embodiment shown in FIG. 6, the mounting element 30 engages backlash-free and formlockingly in the guide rail 11. The projection 373 of the mounting element 30 provides for a formlocking engagement of the mounting element 30 in the guide rail 11 from all sides, except in the longitudinal direction X.

As it follows from the description of the preferred embodiments shown in FIGS. 1–6, the scale 21 is easily replaceable, being arranged outwardly and sidewise of the displacement path of the carriage 12. Contrary to the arrangement shown in U.S. Pat. No. 5,687,489, the cross-section of the guide rail 11 is used to a most possible extent for a stable guidance of the carriage 12. For mounting the linear encoder 20, the space, which is located sidewise of the guide rail 11 and of the displacement path of the carriage 22, is available. This space is available because for guiding the machine slide 2, two parallel, spaced from each other, guide rails 11 are used. The mounting elements 30 can be arbitrary positioned and fixed along the guide rail 11 on homogeneous longitudinal surfaces. As a rule, a sufficient place is available at the end regions of the guide rail 11 for mounting the mounting elements 30. Because the mounting elements 30 limit the displacement of the carriage 12, they are arranged at the limits of the displacement path of the carriage 12.

For mounting the scanning head 22, it is advantageous when it is arranged beneath the scale 21 or is protectedly arranged beneath the housing 23. With the sealed linear encoder 20 shown in FIG. 2, penetration of moisture in the housing 23 is prevented. When the unit is mounted in a machine-tool, the cooling liquid can penetrate through the sealing lips 26 only with much difficulty. The cooling liquid can be safely carried away, without adversely influencing the position measurement.

The scanning head 22 is mounted on the carriage 12. To this end, arms 40, which are directed downwardly, are provided on the carriage 12. The arms 40 have a mounting surface 41 extending parallel to the outer stop surface 33 of the mounting element 30. The scanning head 22 is screwed to the mounting surface 41 as a result of the carrier 25 being screwed to the surface 41. For a parallel alignment of the carrier 25 and, thereby, of the scanning head 22 in the longitudinal direction X, there is provided a bottom stop 42.

For a very long scale 21 or housing 23, supporting the scale 21 or the housing 23 between two mounting elements 30 makes sense. To this end, support means is provided between the scale 21 and the machine slide 2.

Heavy machine slides, often, are carried by several carriages 12, 120 on the guide rail 11. The carriages 20, 120 are spaced from each in the longitudinal direction X and are arranged on a common guide rail. With several carriages 20, 120, the mounting element 300 is arranged between two adjacent carriages 20, 120. For an easy mounting, the mounting element 300 is formed of several parts, with its two side legs 35, 38 being mounted and dismounted independently from each other.

Figure 7:
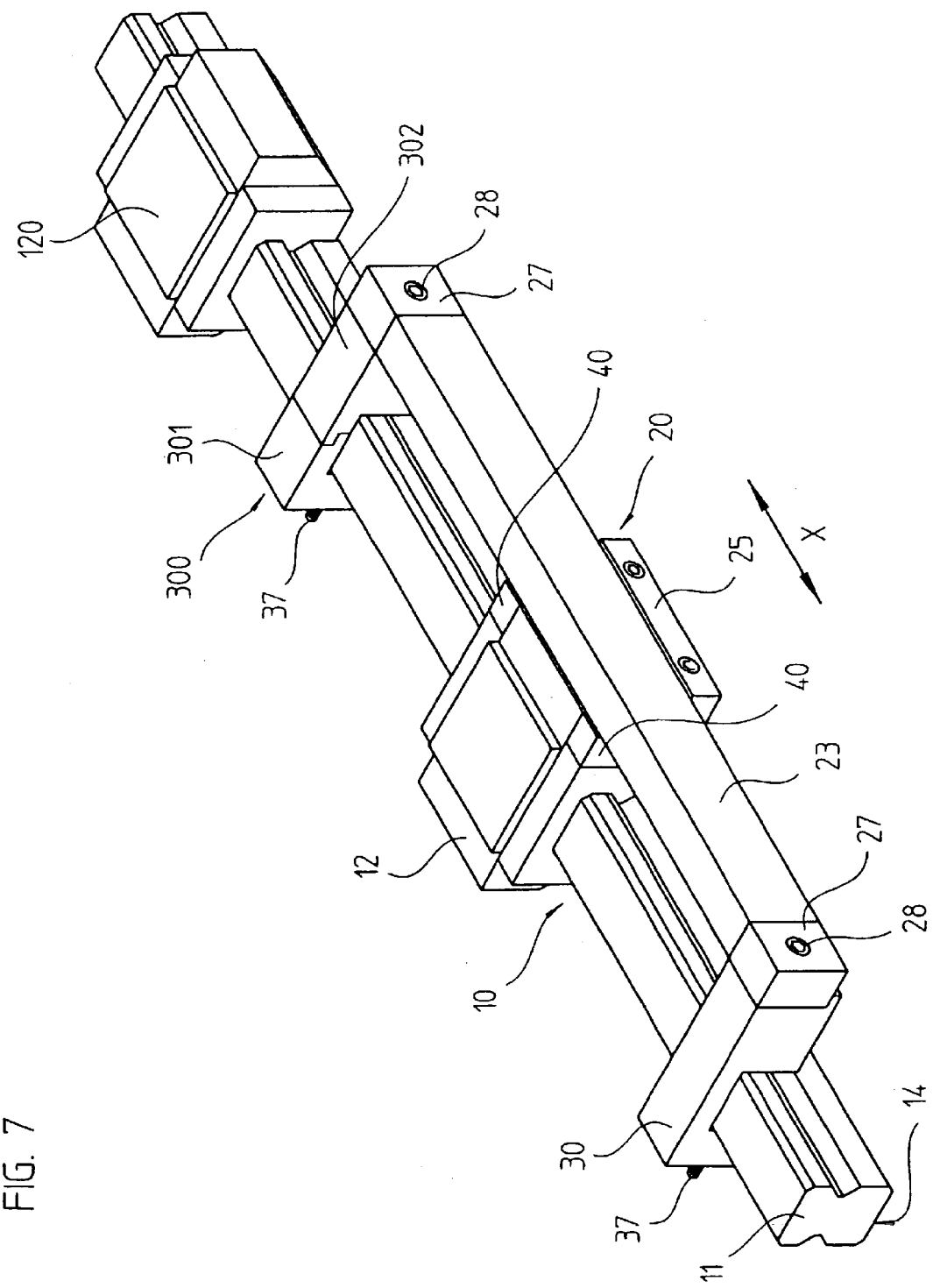
FIG. 7. a perspective view of a further linear guide assembly with several carriages and a linear encoder.

An example of a mounting element formed of several parts is shown in FIG. 7. In FIG. 7, the mounting element 300 is formed of two parts 301, 302, which permits dismounting even with the machine slide 2 being mounted on the carriages. The two parts 301, 302 are connected with each other advantageously by a screw.

It should be noted that a linear encoder can be formed as an open encoder, with the scale being mounted on the mounting brackets 30, 300 directly or with the use of a support not formed as a housing.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claim is:

1. A linear encoder for use with a linear guide assembly formed as a separate unit (10) and including a guide rail (11) extending in a longitudinal direction (X) having a mounting surface (14) for mounting the guide assembly on a mounting surface (100) of a machine, the linear encoder comprising a scale (21); a scanning head (22) for scanning the scale (21); and mounting means (30) for releasably attaching the scale (21) to the guide rail (11) of the guide assembly, the mounting means (30) being arrangeable outside of the mounting surface (14) of the guide rail (11) and having stop surfaces (31, 32) extending perpendicular to the longitudinal direction (X) of the guide rail (11) for a parallel alignment of the scale (21) along the guide rail (11), with the stop surfaces (31, 32) encompassing and engaging reference surfaces (15, 16) of the guide rail (11).

2. A linear encoder according claim 1, wherein the mounting means comprises at least one, U-shaped mounting element (30) having a side leg (35) an inner surface of which forms one of the stop surfaces (31), and a connection leg (36) an inner surface of which forms another of the stop surfaces (32).

3. A linear encoder according to claim 2, further comprising a locking element (37) provided on another side leg (38) of the mounting element (30) for fixedly securing the mounting element (30) to the guide rail (11) of the guide assembly.

4. A linear encoder according to claim 3, wherein the locking element (37) pulls the stop surfaces (31, 32) of the mounting element (30) to the references surfaces (15, 16) of the guide rail (11).

5. A linear encoder according to claim 3, wherein the locking element (37) is a screw.

6. A linear encoder according to claim 5, further comprising an intermediate member (371, 372) which can be positioned with the screw (37), wherein the intermediate member (371, 371) is supported against the guide rail (11) and is formed as one of insert (371) and deflectable part (372) formed on the mounting element (30).

7. A linear encoder according to claim 1, wherein the stop surfaces (31, 32) of the mounting means (30) extend transverse to each other and parallel to the longitudinal direction (X) of the guide rail (11).

8. A linear encoder according to claim 1, wherein the mounting means (30) further comprises further stop surfaces (33, 34) extending transverse to the longitudinal direction (X) of the guide rail (11) for aligning the scale (21) parallel to the guide rail (11) along the guide rail (11), the further stop surfaces (33, 34) cooperating with corresponding stop surfaces (231, 232) of one of the scale (21) and a scale carrier (23).

9. A linear encoder for use with a linear guide assembly formed as a separate unit (10) mountable on one of a base and a slide of a machine and including a guide rail (11) and a carriage (12) displaceable thereon and sidewise encompassing and engaging the guide rail (11), the linear encoder comprising a scale (21); a scanning head (22) for scanning the scale (21); and mounting means (30) for releasably mounting the scale (21) on the guide rail (11), wherein the mounting means (30) is formed as a lever-shaped, salient element for retaining the scale (21) sidewise adjacent to the carriage (12) of the guide assembly.

10. A linear encoder according to claim 9, wherein the mounting means (30) comprises stop surfaces (31, 32) extending perpendicular to the longitudinal direction (X) of the guide rail (11) for a parallel alignment of the scale (21) along the guide rail (11), with the stop surface (31, 32) encompassing and engaging reference surface (15, 16) of the guide rail (11).

11. A linear encoder according to claim 10, wherein the stop surfaces (31, 32) of the mounting means (30) extend transverse to each other and parallel to the longitudinal direction (X) of the guide rail (11).

12. A linear encoder according claim 9, wherein the mounting means comprises at least one, U-shaped mounting element (30) having a side leg (35) an inner surface of which forms one of the stop surfaces (31), and a connection leg (36) an inner surface of which forms another of the stop surfaces (32).

13. A linear encoder according to claim 12, further comprising a locking element (37) provided on another side leg (38) of the mounting element (30) for fixedly securing the mounting element (30) to the guide rail (11) of the guide assembly.

14. A linear encoder according to claim 13, wherein the locking element (37) pulls the stop surfaces (31, 32) of the mounting element (30) to the reference surfaces (15, 16) of the guide rail (11).

15. A linear encoder according to claim 13, wherein the locking element (37) is a screw.

16. A linear encoder according to claim 15, further comprising an intermediate member (371, 372) which can be positioned with the screw (37), wherein the intermediate member (371, 372) is supported against the guide rail 11 and is formed as one of insert (371) and deflectable part (372) formed on the mounting element (30).

17. A linear encoder according to claim 9, wherein the mounting means (30) further comprises further stop surfaces (33, 34) extending transverse to the longitudinal direction (X) of the guide rail (11) for aligning the scale (21) parallel to the guide rail (11) along the guide rail (11), the further stop surfaces (33, 34) cooperating with corresponding stop surfaces (231, 232) of one of the scale (21) and a scale carrier (23).

18. A guide assembly formed as a separate unit (10) and comprising a guide rail (11) having a mounting surface (14) for mounting the guide rail (11) on a mounting surface (100) of a machine; a carriage (12) displaceable on the guide rail (11) and securable to a part of the machine displaceable relative to the mounting surface (100) of the machine; and a linear encoder (20) having a scale (21); a scanning head (22) for scanning the scale (21); and mounting means (30) for releasably attaching the scale (21) to the guide rail (11) of the guide assembly, the mounting means (30) being arrangeable outside of the mounting surface (14) of the guide rail (11) and having stop surfaces (31, 32) extending perpendicular to the longitudinal direction (X) of the guide rail (11) for a parallel alignment of the scale (21) along the guide rail (11), with the stop surfaces (31, 32) encompassing and engaging reference surfaces (15, 16) of the guide rail (11).

19. A linear guide assembly according to claim 18, wherein the mounting means (30) is formed as a lever-shaped, salient element for retaining the scale (21) sidewise adjacent to the carriage (12).

20. A linear guide assembly according to claim 19, wherein the linear encoder (20) further has a housing (23) in which the scale (21) and the scanning head (22) are arranged and which has a slot facing downwardly toward the mounting surface (100) of the machine; and sealing elements (26) for sealing the slot.

21. A linear guide assembly according to claim 20, wherein the linear encoder (20) has a carrier (25) with which the scanning head (22) is secured to the carriage (12), wherein the carriage (12) has a support (40) facing the mounting surface (100) of the machine, and wherein the support (40) has a surface (41) providing for mounting the carrier (25) between the encoder housing (23) and the mounting surface (100) of the machine.

* * * * *